Sept. 3, 1963 W. W. DOLLISON 3,102,592
RETRIEVABLE DRILL PIPE PLUG
Filed Feb. 16, 1959 6 Sheets-Sheet 1

INVENTOR
William W. Dollison
BY *[signature]*
ATTORNEY

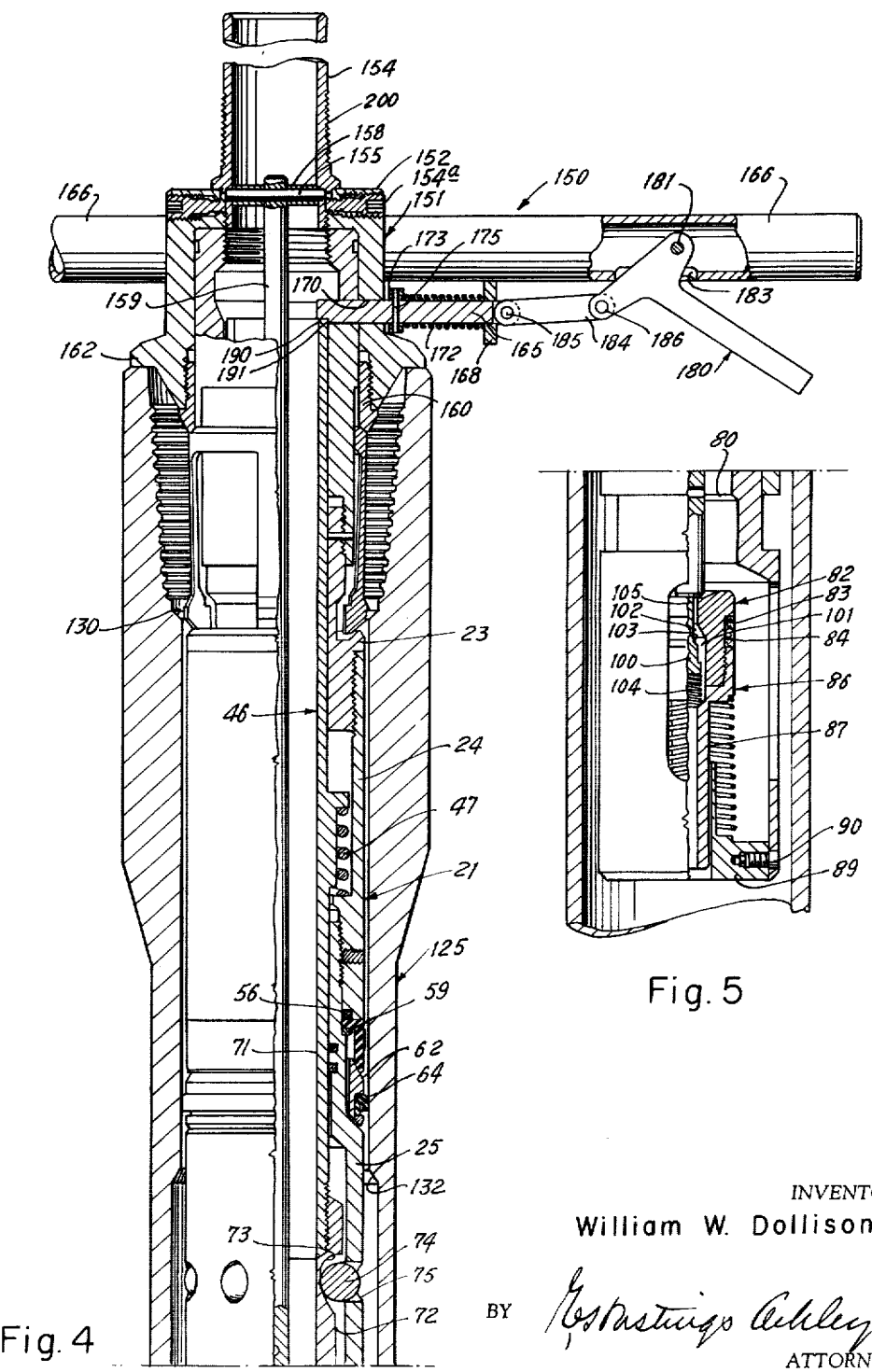

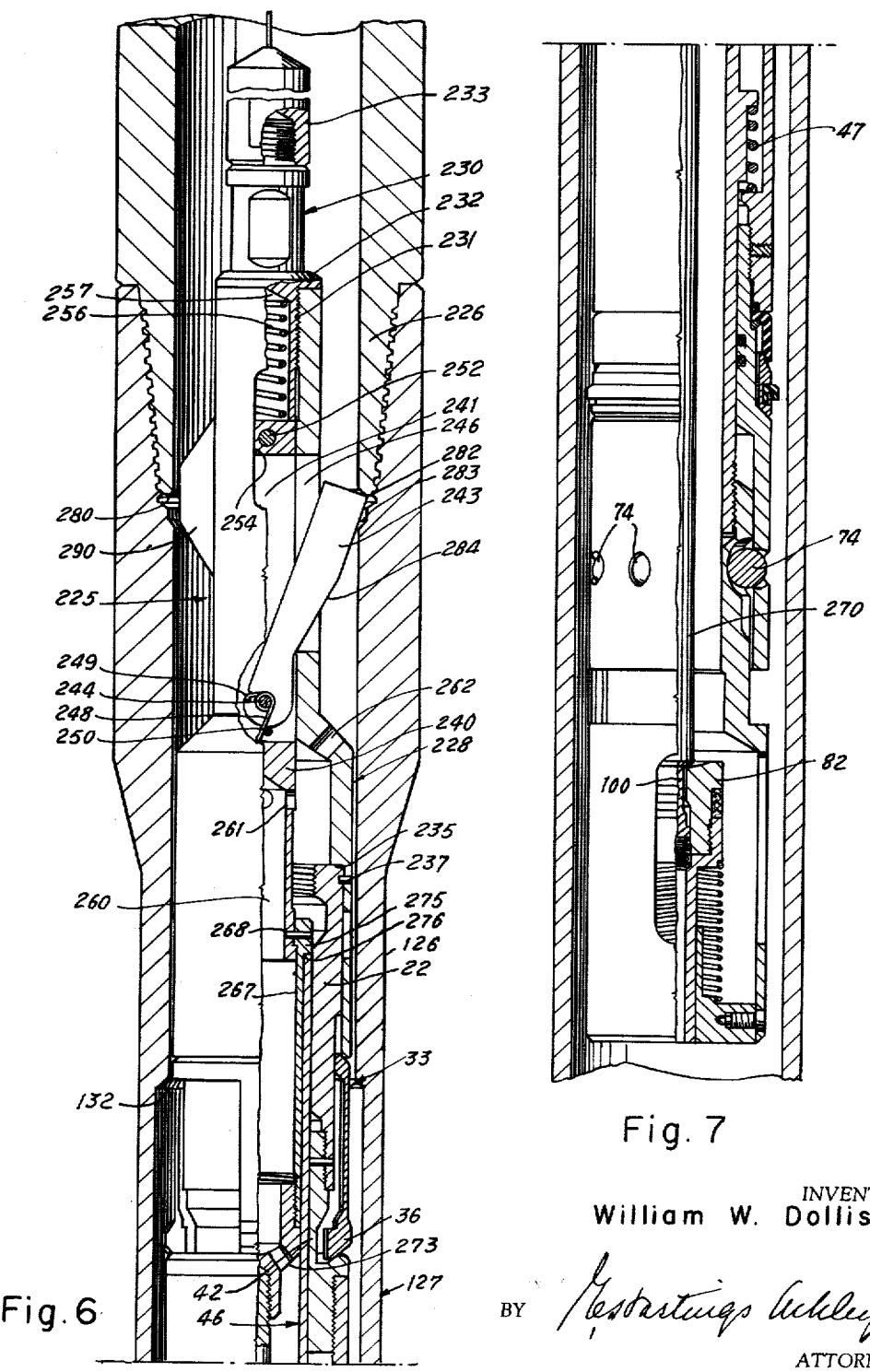

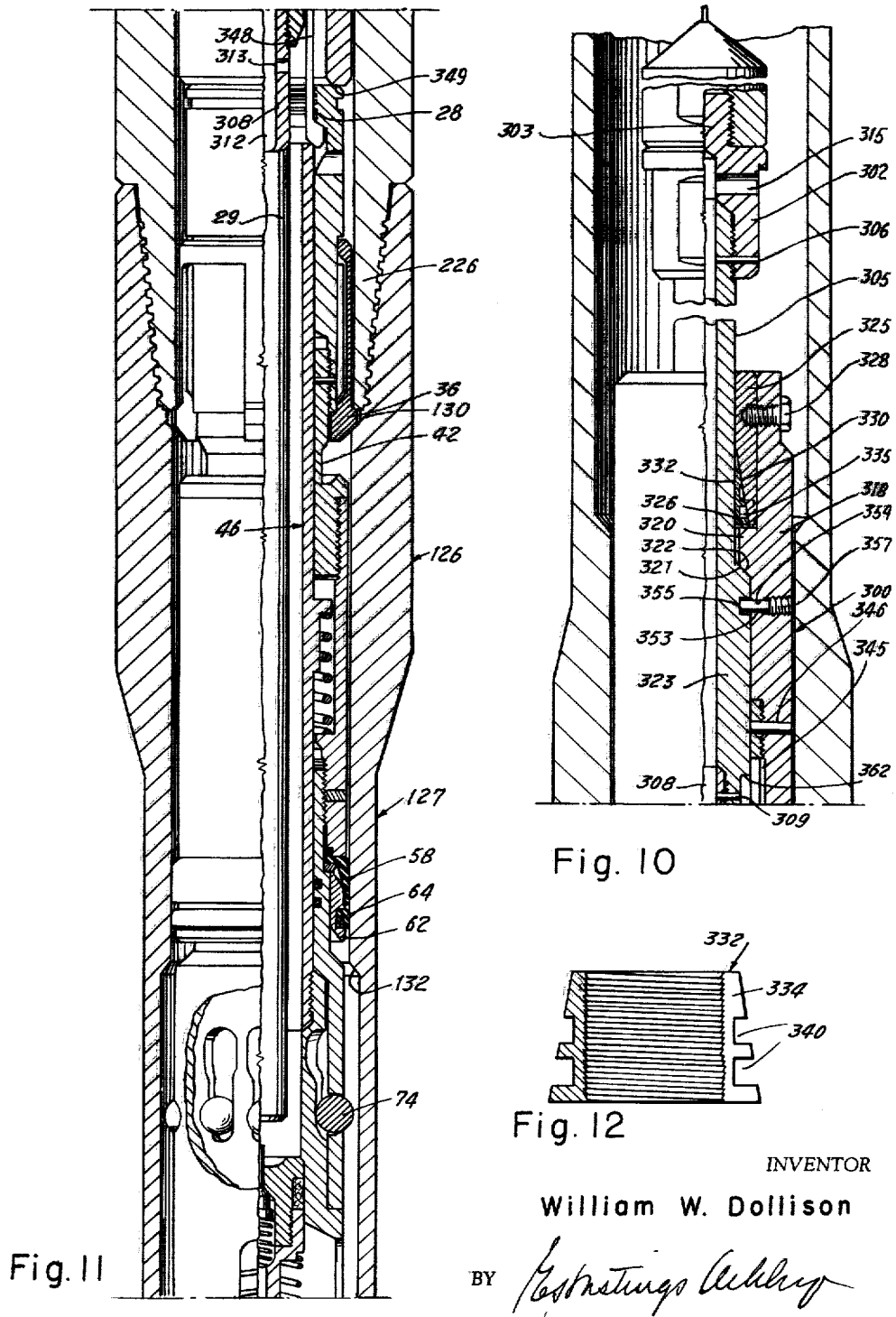

INVENTOR
William W. Dollison
BY *Hastings Ackley*
ATTORNEY

United States Patent Office 3,102,592
Patented Sept. 3, 1963

3,102,592
RETRIEVABLE DRILL PIPE PLUG
William W. Dollison, Dallas, Tex., assignor to Otis Engineering Corporation, Dallas County, Tex., a corporation of Delaware
Filed Feb. 16, 1959, Ser. No. 793,338
28 Claims. (Cl. 166—125)

This invention relates to well tools, and more particularly to a removable plug for well conductors, such as drill pipes, and to running tools for positioning the plug in the flow conductor in a predetermined location therein and for removing such plug from the flow conductor.

An object of the invention is to provide a plug for a well flow conductor, such as a drill pipe, which is removably positionable in the flow conductor at a predetermined location therein.

Still another object of the invention is to provide a plug for a drill pipe which is provided with a check valve to permit flow of fluids therethrough in one direction only.

A further object of the invention is to provide a plug which is movably lockable in a drill pipe at a predetermined location therein.

A still further object of the invention is to provide a drill plug having sealing means for sealing between the plug and the drill pipe to prevent flow of fluids therepast.

A still further object of the invention is to provide a plug for drill pipe or the like having an outer tubular member, having means for locking the outer tubular member in a predetermined position in a drill pipe against displacement therein in either longitudinal direction, and having a tubular sleeve movably mounted in the outer member for limited longitudinal movement therein and cooperable with the locking means of the outer member upon movement to one extreme position in the outer tubular member to lock the outer tubular member against movement in one longitudinal direction in the flow conductor.

Another object is to provide a plug for a flow conductor, such as a drill pipe, wherein the inner sleeve is provided with valve means closing its longitudinal bore and preventing flow of well fluids in one direction therethrough while permitting flow of well fluids in the opposite direction therethrough.

Still another object of the invention is to provide a plug for a flow conductor, such as a drill pipe, wherein the outer member which is lockable in the flow conductor is provided with sealing means for sealing between the outer member and the flow conductor in which it is positionable.

A further object of the invention is to provide a plug for a flow conductor, such as a drill pipe, having an outer tubular member provided with a resilient member for engaging an upwardly facing shoulder of the drill pipe to limit downward movement of the outer member in the drill pipe and with a second locking means which is movable to an outer expanded position wherein it extends outwardly of the outer member for engaging a downwardly facing shoulder of the drill pipe to limit upward movement of the outer tubular member in the drill pipe.

A still further object of the invention is to provide a well plug for a flow conductor, such as a drill pipe, which is provided with an outer member and with a sleeve telescoped in the outer member wherein the outer member has locking means engageable with a first latch means to prevent movement of the first latch means out of engagement with an upwardly facing shoulder of the drill pipe and which is provided with a second locking means engageable with a second latch means for moving the second latch means into its outer locking position and preventing inward movement of such locking means to prevent movement of the second latch means out of engagement with a downwardly facing shoulder of the drill pipe upon upward movement of the locking sleeve to its upper locking position, the sleeve permitting movement of the second latch means to inner retracted position upon downward movement of the sleeve in the outer member whereby the plug may be inserted into and removed from the drill pipe.

An object of the invention is to provide a running tool for positioning the plug in a predetermined position in a flow conductor, such as a drill pipe, and for removing the plug from the flow conductor.

Another object of the invention is to provide a running tool for the plug which is provided with means for holding the sleeve of the plug in its lower inoperative position whereby the locking means of the outer member are movable inwardly to permit movement of the plug through the drill pipe to a predetermined position therein.

Still another object of the invention is to provide a running tool which is also provided with means for holding the valve closing the passage of the sleeve in open position in order to permit movement of the plug through a flow conductor which is filled with fluid, such as drilling mud.

A further object of the invention is to provide a running tool for the plug which is releasably connected to the plug whereby the well tool may be disconnected from the plug when the plug has been moved to a predetermined position in the drill pipe to lock the plug in the drill pipe at such predetermined position.

A still further object of the invention is to provide a running tool for positioning the plug in a drill pipe at a predetermined location therein which has means for holding the inner sleeve of the plug in its lowermost position during movement of the plug through the drill pipe to the predetermined location and a transverse member which is movable into the bore of the outer member of the plug to engage the upper end of the valve sleeve to hold it against upward movement toward its upper locking position.

Another object of the invention is to provide a running tool for the well plug which is provided with means for engaging a downwardly facing shoulder of the drill pipe to free the inner sleeve of the plug for movement to its upper locking position and to permit withdrawal of the running tool from the plug and the drill pipe whereby the check valves of the valve sleeve are freed to move to their upper closed positions in the valve sleeve.

Still another object of the invention is to provide a running tool for removing the plug from the drill pipe which includes a prong for opening the check valve of the inner sleeve and means for moving the inner sleeve to its lower position wherein retraction of the locking means of the outer member of the plug permits the upward removal of the tubular member and with means for engaging the outer member whereby the plug may be removed from the well by an upward force exerted on the outer member of the plug.

A further object of the invention is to provide a plug for flow conductor, such as drill pipe, wherein the plug is provided with two sealing elements to seal between the plug and the well conductor, one of the elements being of relatively hard material whereby it must be expanded into sealing engagement with the well conductor and the other of the sealing elements being mounted on the expander and being of softer material whereby the engagement of the other of the sealing elements with the well conductor creates a pressure differential across the expander which moves it relative to the first sealing element to move it into engagement with the flow conductor.

Still another object of the invention is to provide a well tool having a first resilient seal to form an initial seal between the well conductor and the well tool, the first resilient seal being carried by an expander element which is movable relative to a second, less resilient seal element to expand the second seal element into sealing engagement with the well conductor.

Additional objects and advantages of the invention will be readily apparent from the reading of the following description of devices constructed in accordance with the invention, and reference to the accompanying drawings thereof, wherein:

FIGURE 4 is a vertical view, partly in elevation and partly in section, of a running tool constructed in accordance with the invention connected to the plug illustrated in FIGURES 1 through 3 and showing the upper portion of the plug being positioned in a drill pipe;

FIGURE 5 is a vertical view, partly in elevation and partly in section, of the lower portion of the plug and of the drill pipe illustrated in FIGURE 4, and is a continuation of FIGURE 4;

FIGURE 6 is a vertical view, partly in elevation and partly in section, of another form of a running tool constructed in accordance with the invention showing the running tool connected to the valve plug and the various elements of the plug and of the running tool in the positions assumed during the downward movement of the running tool to a predetermined position in the drill pipe;

FIGURE 7 is a vertical view, partly in elevation and partly in section, showing the lower portion of the running tool and plug illustrated in FIGURE 6 and is a continuation of FIGURE 6;

FIGURE 10 is a vertical view, partly in elevation and partly in section, of the upper portions of another form of a running and retrieving tool constructed in accordance with the invention showing the various elements of the plug and of the retrieving tool in positions assumed at an intermediate stage of the operation of the retrieving tool prior to its complete connection to the plug;

FIGURE 11 is a vertical view, partly in elevation and partly in section, showing the lower portions of the running and retrieving tool and plug illustrated in FIGURE 10 and is a continuation of FIGURE 10;

FIGURE 12 is a vertical sectional view of an element of the running and retrieving tool illustrated in FIGURES 10 and 11;

Figure 15:
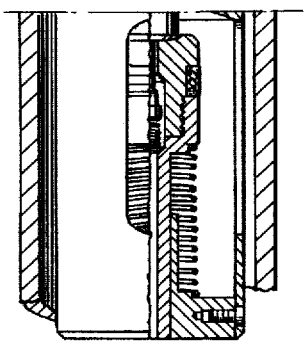
Figure 14:
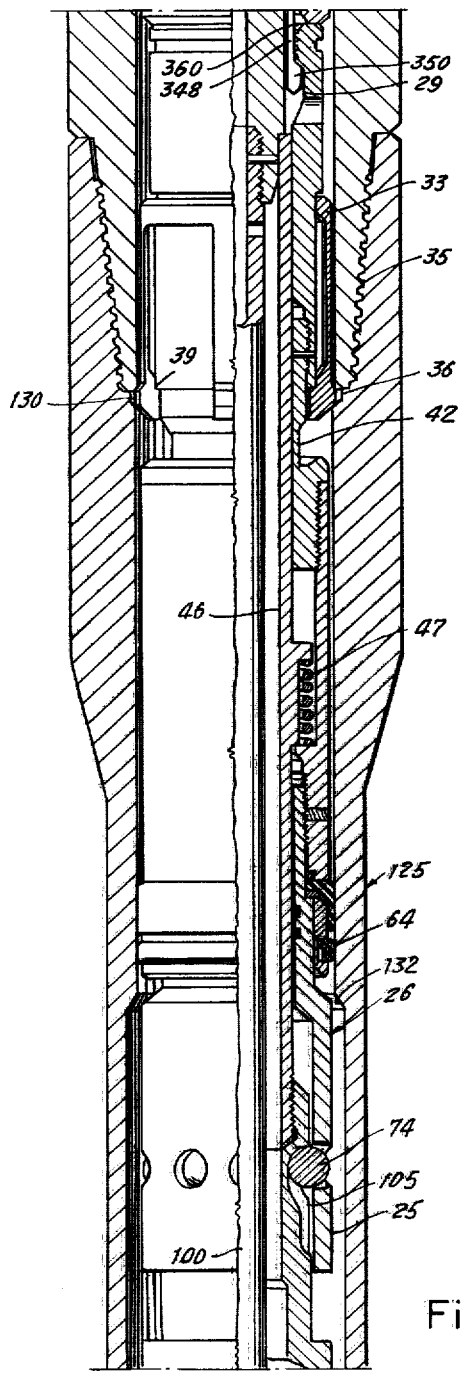
Figure 13:
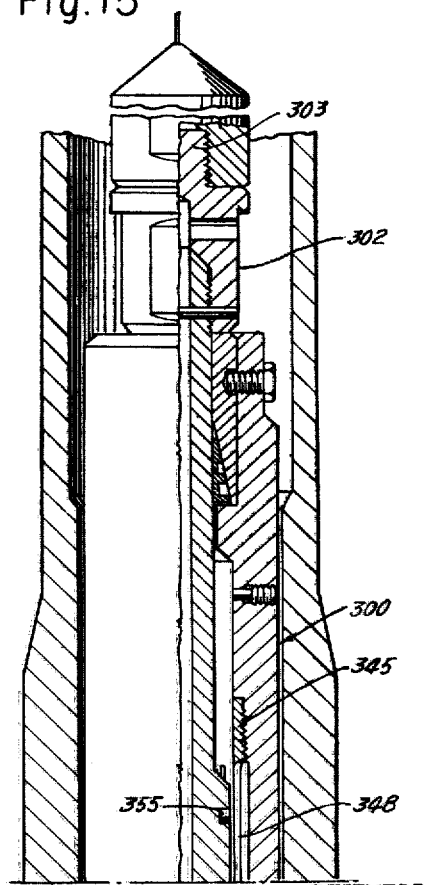

FIGURES 13 is a vertical view, partly in elevation and partly in section, of the upper portions of the running and retrieving tool shown in FIGURES 10 and 11, showing the elements of the running and retrieving tool and well plug in the positions assumed when the running and retrieving tool is completely connected to the plug prior to the upward removal of the plug by the running and retrieving tool;

FIGURE 14 is a vertical view, partly in elevation and partly in section, of intermediate portions of the running tool and plug illustrated in FIGURE 13 and is a continuation of FIGURE 13; and FIGURE 15 is a vertical view, partly in elevation and partly in section, of the lower portions of the running tool and plug illustrated in FIGURES 13 and 14 and is a continuation of FIGURE 14.

Referring now to the drawing, the plug 20 for a flow conductor includes an outer tubular member 21 which comprises an upper sub 22, a collet lock sleeve 23, a spring retainer sleeve 24 and a ball retainer sleeve 25. The upper sub 22 is provided with an external annular groove 27 and internal threads 28 as well as with an internal annular recess 29. The upper sub has a reduced lower portion which provides a downwardly facing annular shoulder 31 below which is slidably mounted, on the reduced lower end of the upper sub, a collet 33 having a plurality of dependent resilient collet fingers 35 whose lower ends are provided with external bosses 36, the bosses having outwardly convergent upper and lower shoulders.

The collet fingers 35 are also provided with upwardly facing shoulders 37 which are adapted to engage the lower end of the upper sub 22 to limit upward movement of the collet 33 on the upper sub. The outer surface of the upper sub, when the collet 33 is in its upper position, engages the internal surfaces of shoulders 39 of the collet fingers adjacent the bosses 36 to prevent inward movement of the lower ends of the collet fingers, and, therefore, of the bosses 36.

The collet lock sleeve 23 has its upper end threaded in the enlarged bore of the upper sub at the lower end thereof and is provided with an external annular recess 42 in which the lower ends of the collet fingers may be received while in retracted positions when the collet is in its lower position on the upper sub, the external recess 42 of the collet lock sleeve 23 having a confirmation suitable for receiving the enlarged inwardly projecting lower ends of the collet fingers 35.

Figure 1:
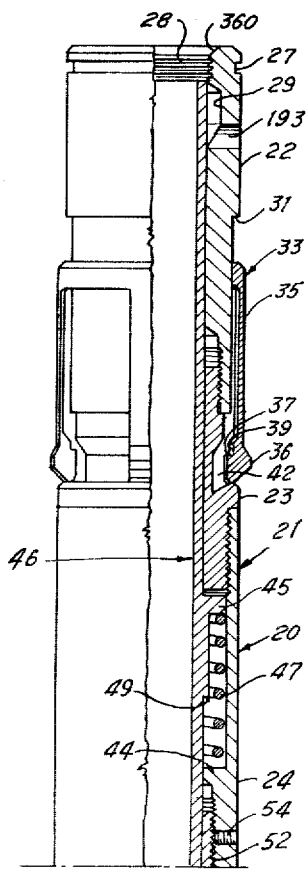
FIGURE 1 is a vertical view, partly in elevation and partly in section, of the upper portion of the plug constructed in accordance with the invention.

The spring retainer sleeve 24 threaded on the lower reduced end of the collet lock sleeve 23 is provided intermediate its ends with an internal flange 44 which, with the external flange 45 of the inner sleeve 46 of the plug, forms a cylindrical chamber in which is disposed a spring 47. The opposite ends of the spring 47 abut the upper and lower surfaces of the flanges 44 and 45 of the spring retainer sleeve and the inner sleeve, respectively, to bias the inner sleeve upwardly to the upper position illustrated in FIGURE 1.

The inner sleeve 46 of the plug 20 is also provided with a downwardly facing shoulder 49 which is adapted to engage the upwardly facing shoulder of the internal flange 44 of the spring retainer sleeve 24 to limit downward movement of the inner sleeve in the outer tubular member 21. The ball retainer sleeve 25 has its upper reduced end threaded in the lower end of the spring retainer sleeve 24 and is held against rotational movement thereby by lead shot 52 in a suitable lateral bore of the spring retainer sleeve which is compressed against the threaded upper end of the ball retainer sleeve 25 by a plug 54 threaded in the lateral bore.

The lower end of the spring retainer sleeve 24 is provided with a downwardly opening annular recess in which an O-ring 56 is disposed to seal between the ball retainer sleeve and the spring retainer sleeve. A resilient valve cup 58 encircles the ball retainer sleeve 25 and has an internal flange at its upper end which is engaged by the retainer ring 59 held in position on the upper end of the ball retainer sleeve by the upwardly facing shoulder 60 thereof. The upper surface of the valve cup 58 abuts the lower end of the spring retainer sleeve 24.

The valve cup 58 is of relatively hard material in order that it may withstand high pressure differentials. Because of its hardness, it is made slightly smaller than the internal diameter of the drill pipe and does not have a sealing engagement with the drill pipe so that a pressure differential cannot be established across the element to cause it to seal unless it is first expanded.

Figure 2:
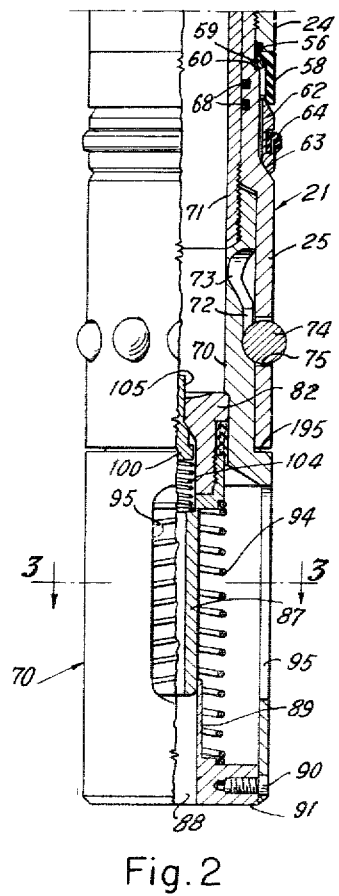
FIGURE 2 is a vertical view, partly in elevation and partly in section, of the lower portion of the plug shown in FIGURE 1.
Figure 3:
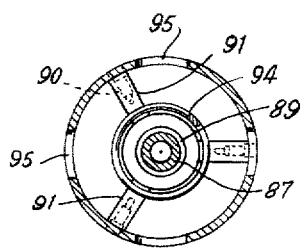
FIGURE 3 is a sectional view taken on line 3—3 of FIGURE 2.

An annular cup expander 62 is slidably disposed on the upper portion of the ball retainer sleeve 25 and is held thereon by the external downwardly and outwardly extending upper shoulder 63 of the ball retainer sleeve. The cup expander 62 has a lower internal shoulder which corresponds in configuration to the shoulder 63 which it is adapted to engage when in the lower position illustrated in FIGURE 2. The upper end of the cup expander is beveled upwardly and inwardly whereby it tends to cam the free lower end of the cup valve 58 outwardly upon upward movement of the cup expander on the upper end of the ball retainer sleeve 25. The cup expander 62 is provided with a resilient annular seal member 64, disposed in a suitable external outer recess of the expander 62, in which it may be secured in any suitable manner, as by a suitable bonding agent. The seal member 64 has an external lip which constantly engages the interior surface of any flow conductor in which the plug may be disposed so that any fluid in the flow conductor tends to move the cup expander upwardly on the ball retainer sleeve to engage the cup valve and move it to expanded position on upward movement of any fluids in the flow conductor between the plug and the flow conductor.

The upper portion of the ball retainer sleeve 25 is also provided with a plurality of internal recesses in which are disposed O-rings or other sealing members 68 which seal between the inner sleeve 46 and the ball retainer sleeve 25.

The inner sleeve has a lower valve seat sleeve section 70 whose reduced upper end is threaded on the lower end of the upper section 71 of the inner sleeve 46. The lower section 70 of the inner sleeve is provided with a plurality of circumferentially spaced longitudinal slots 72 whose upper ends terminate in deep recesses 73. A stainless steel ball 74 is disposed in each of the longitudinal recesses 72 and extends outwardly into aligned ball retainer apertures 75 in the lower enlarged portion of the ball retainer sleeve 25. The apertures 75 have outwardly convergent lips whereby the balls 74 are permitted to extend partially outwardly of the ball retainer sleeve 25 into expanded positions but are prevented from passing completely outwardly therethrough.

When the inner sleeve is in its upper position relative to the outer tubular member 21 of the plug, the stainless steel balls 75 are in the longitudinal recesses 72 and therefore extend outwardly of the ball retainer sleeve 25. When the inner sleeve 46 however, is moved downwardly relative to the outer tubular member 21 of the plug, the apertures 75 of the ball retainer sleeve 25 are aligned with the deep recesses 73 whereby the balls may move inwardly into the recesses to retracted positions, as shown in FIGURE 4, wherein no portions thereof extend outwardly of the ball retainer sleeve 25.

The internal bore of the valve seat sleeve 70 is enlarged intermediate its ends to provide a downwardly facing annular shoulder 80 which is adapted to engage the upper end of a valve 82 to limit upward movement thereof in the valve seat sleeve 70. The valve 82 has a reduced lower portion which provides a downwardly facing shoulder 83. A packer or seal assembly 84, which may be of the chevron type, is held on the valve 82 between the shoulder 83 and the upper end of a tubular retainer 86 which is threaded on the lower end of the valve 82. The retainer 86 has a dependent reduced tubular stem 87 which extends into the bore 88 of the stem guide 89 secured in the lower end of the valve seat sleeve 70 by a plurality of screws 90 which extend through suitable apertures in the lower end of the lower sleeve section 70 into suitable threaded bores in the ends of the angularly outwardly extending arm 91 of the stem guide 89. The retainer 86 is provided with a downwardly facing shoulder against which bears the upper end of a biasing spring 94. The lower end of the spring bears against the arms 91 of the stem guide 89. The spring 94 biases the valve 82 upwardly to the closed position illustrated in FIGURE 2.

The lower section 70 of the inner sleeve 46 is provided with lateral longitudinal windows 95 so that fluids, such as drilling mud, may flow not only through the open lower end of the sleeve between the arms 91 of the stem guide 89 but also through such windows 95.

A secondary valve 100 is disposed in the central bore 101 of the valve 82 and is provided with a shoulder which is adapted to engage the upwardly and inwardly extending annular valve seat 102 of the valve 82. The secondary valve 100 is biased upwardly toward closed position by a spring 104 which bears against an upwardly facing internal shoulder of the tubular valve stem 87 and against the lower end of the secondary valve. The secondary valve is also provided with a prong 105 whose upper end is disposed above the upper end of the valve 82 when the secondary valve is in its upper closed position and its external shoulder 103 abuts the valve seat 102.

It will thus be apparent that the springs 94 and 104 tend to move the valves 82 and 100 toward their closed position wherein such valves close the lower ends of the inner sleeve 46 to prevent upward flow of fluids through such inner sleeve. It will also be apparent that when fluids, such as drilling mud, are pumped downwardly through the inner sleeve 46, the valve 82 will be moved downwardly against the force of the spring 94 to an open position to permit downward flow of the well fluid past the plug 20. Reverse or upward flow of such fluids is prevented since reverse flow of such fluid will tend to aid the spring 94 in moving the valve 82 to the closed position illustrated in FIGURE 2.

The secondary valve 100 is provided to permit a relatively small force to move such secondary value to its lower position to equalize the pressure above and below the main valve 82 whereby the main valve may then be easily moved to its lower open position as is required when the plug is to be removed from the flow conductor, such as the drill pipe box, in which it may be seated.

It will be apparent that when the plug 20 is positioned either in the drill pipe box 125 at the surface of the well, as illustrated in FIGURE 4, or in the drill pipe box 126 in the well, as illustrated in FIGURE 11, of a drill pipe 127, the well plug 20 is prevented from moving downwardly in such drill pipe boxes by the engagement of the downwardly facing shoulders of the bosses 36 of the collet 35 with the downwardly and inwardly extending stop shoulder 130 of such drill pipe boxes since the collet 33 is moved upwardly on the outer tubular member 21 when such lower shoulders of the bosses 36 engage the shoulders 130 to cause the internal surfaces 39 of the bosses to engage the outer surface of the top sub 22 so that the lower ends of the collet fingers cannot flex inwardly and the collet bosses are therefore held in their outwardly expanded locking positions as illustrated in FIGURES 11 and 14. The collet 33 thus prevents downward movement of the plug 20 in the drill pipe.

Figure 9:
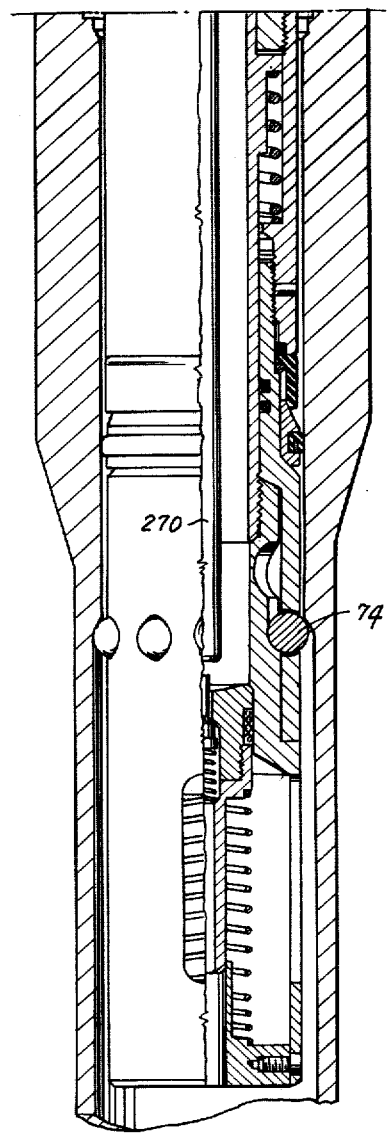
FIGURE 9 is a vertical view, partly in elevation and partly in section, of the lower portions of the running tool and plug illustrated in FIGURE 8 and is a continuation of FIGURE 8.

The inner valve sleeve 46 is in the upper position illustrated in FIGURES 9 and 11 due to the biasing action of the spring 47 relative to the outer tubular member 21 so that the stainless steel balls 74 extend outwardly of the ball retainer sleeve 25 since the slots 72 are now aligned with the ball apertures 75 of the ball retainer sleeve 25. The stainless steel balls therefore are adapted to engage the downwardly facing shoulder 132 of the drill pipe boxes, which are disposed below the upwardly facing shoulders 130, and the balls 74 therefore limit upward movement of the plug in such drill pipe boxes. The plugs are normally in the lower positions in the drill pipe boxes illustrated in FIGURES 11 and 15 since the pumping of the drill mud downwardly through the drill pipe, of which the drill pipe boxes of course constitute sections, tends to move the plugs downwardly to the positions illustrated in the FIGURES 5 and 15. Should the pressures below the plugs for some reason exceed the pressures above the plugs, as for example, if the pumping is stopped and formation pressures are present, the valve plugs may move upwardly relative to the drill pipe boxes. Such upward movement of the outer tubular member causes the recesses 42 of the collet lock sleeve 23 to become aligned with the collect bosses 36 so that the collet bosses may move inwardly to permit further upward movement of the outer tubular member in the drill pipe box until such movement is arrested by the engagement of the balls 74 with the downwardly facing shoulder 132 of the drill pipe box.

It will be apparent that the cup expander 62 is moved to the upper expanding position by the pressure differential created thereacross by the fluids, such as the drilling mud, which acts on the seal member 64 to move the cup expander 62 upwardly to engage the value cup 58 to move it into engagement with the internal surface of the drill pipe below the shoulder 132. It will of course be apparent that the pressure differential created across the cup 58 itself will also tend to move the outer dependent annular end of the valve cup 58 into tight sealing engagement with the drill pipe whereby upward flow of the well fluids between the outer tubular member and the drill pipe is prevented.

If drilling mud is now pumped into the drill pipe in the usual manner, the valve 82 will move downwardly to permit drilling mud to flow downwardly through the central bore of the internal sleeve 46 and thus through the drill pipe. Upward flow of drilling fluid of course is prevented by the action of the check valve 82 which moves upwardly to close the longitudinal flow passage of the inner sleeve 46 whenever the pressure above the plug 82 decreases to such degree that reverse or upward flow of the drilling mud could otherwise occur.

It will now be apparent that a plug 20, positionable in a selected drill pipe box of a drill pipe 127, has been illustrated and described which includes an outer elongate tubular member 21 which is provided with a locking means, such as the collet 33, which limits downward movement of the plug 20 in such drill pipe and that the outer tubular member and the inner sleeve 46 are provided with cooperating means which serve to lock the plug against upward movement in the drill pipe.

It will further be seen that the cooperating means comprise an inner sleeve 46 which is biased upwardly to move the balls 74 outwardly of the outer tubular member whereby such balls may engage the downwardly facing shoulder 132 of the drill pipe box to limit upward movement of the outer tubular member in the drill pipe.

It will further be seen that the outer tubular member is provided with a sealing means which is moved into engagement with the drill pipe by the action of the pressure of the fluid within the drill pipe to prevent upward flow of fluids between the outer tubular member and the drill pipe.

It will also be seen that sealing means are provided between the inner sleeve 46 and the outer tubular member 21 so that flow of well fluids through the plug may take place only through the central flow passage of the inner sleeve controlled by the valve 82 which permits downward flow of well fluids through the plug but does not permit upward flow of fluids through the plug.

It will also be seen that the valve 82 is provided with a secondary valve 100 which may be moved downwardly to an open position to equalize the pressure above and below the valve 82 when it is desired to remove the plug from the drill pipe.

In FIGURES 4 and 5 is illustrated an operating tool 150 for running in or installing and removing or retrieving the plug 20 from the drill pipe box 121 which is at the upper end of the drilling pipe at the surface of the well where it is readily accessible. The running tool 150 includes a tubular body 151 provided with an internal flange 152 at its upper end in which is threaded one end of a sleeve 154. The sleeve 154 may be rigidly held against accidential displacement in the tool body 151 by means of set screws 154a threaded into suitable lateral bores of the tool body. The sleeve 154 is provided with aligned transverse apertures in which is receivable a transverse pin 155 extending through spacer sleeves 158 and a suitable transverse aperture in the upper end of a prong 159. The spacer sleeves 158 maintain the prong 159 in proper central alignment with the sleeve 154 and the tool body 151.

The bore of the tubular body 151 is enlarged at its lower end and a collet engaging ring 160 is threaded thereinto. The tool body 151 is also provided with an external flange 162 which is adapted to engage the upper end of the drill pipe box 125 to limit downward movement of the tool body relative to the drill pipe box. A transverse catch 165 is movably mounted on one of the handles 166, which extend in opposite directions from the tool body 151, by means of the lug 168 secured to lug handle 166 by any suitable means, such as a weld. The lug 168 has an aperture through which the catch 165 is slidable.

The catch 165 is biased inwardly through a suitable lateral aperture 170 of the tool body by means of a spring 172 which is disposed about the catch 165 whose outer ends bear against the lug 168 and against a retainer ring 173 rigidly secured to the catch 165 by means of a suitable pin 175. The catch 165 is movable outwardly by means of a bell crank 180 which is pivotally secured to the handle 166 by means of a shaft 181 which extends through a suitable aperture in the bell crank lever 180 and through aligned apertures in the handle 166. As is clearly shown in FIGURE 4, the bell crank lever has a portion which extends inwardly into the handle 166 through an aperture 183 thereof. The bell crank lever 180 is connected to the outer end of the catch 165 by a link 184 whose opposite ends are pivotally connected to the catch and to the bell crank by means of pins 185 and 186, respectively.

It will be apparent when the bell crank 181 is pivoted in a counter-clockwise manner, as seen in FIGURE 4, the catch 165 will be moved outwardly of the valve body 151 and that when the bell crank 180 is released, the spring 172 will tend to move the catch 165 inwardly of the valve body 151, the bell crank pivoting in a clockwise manner to permit said inward movement of the catch 165.

The catch is provided at its lower end with a downwardly facing shoulder 190 and with a vertical shoulder 191, the downwardly facing shoulder 190 is adapted to engage the upper end of the inner sleeve 46 while the vertical shoulder 191 is adapted to engage the outer surface of the external sleeve to limit inward movement of the catch. It will be apparent that when the valve tool 150 is connected to the valve 20, the catch 165 is employed to hold the inner sleeve in the lower position shown in FIGURES 4 and 5 so that the recesses 73 are aligned with the ball apertures 75 whereby the balls may be moved inwardly of the exterior surface of the ball retainer sleeve 25.

In use, when it is desired to install the plug 20 in the drill pipe box 125 which is at the surface of the well to stop the back flow of drilling mud therethrough, the running tool 150 is first connected to the plug 20. The plug 20 is prepared for connection to the running tool 150 by unscrewing the collet lock sleeve 23 from the upper end of the spring retainer sleeve 24 to such degree that the lower end of the lateral aperture 193 of the upper sub 22 is disposed above the upper end of the inner sleeve 46. Such unscrewing movement of the collet lock sleeve does not permit upward movement of the inner sleeve 46 since the inner sleeve is now held against upward movement relative to the spring retainer sleeve into the ball retainer sleeve by the action of the lower end of the ball retainer sleeve 25 which engages the upwardly facing shoulder 195 of the lower sleeve section 70 of the inner sleeve 46.

The bell crank 180 is then pivoted in a counter-clockwise manner to move the catch 165 outwardly so that the upper end of the upper sub 22 of the plug 20 may be telescoped in the valve body 151 until the transverse aperture 193 thereof is aligned with the transverse aperture 170 of the valve body 151. When this occurs the bell crank 180 is allowed to pivot in a clockwise manner to the position illustrated in FIGURE 4 so that the catch 165 extends through the aligned apertures 173 and 193 of the tool body 151 and the upper sub 22 whereby the downwardly facing shoulder 190 of the catch 165 will be disposed above the upper end of the inner sleeve 46. At this time the collet engaging ring or bushing 160 engages the collet 33 to hold it in the lower position on the upper sub 22 illustrated in FIGURE 4 wherein the bosses 36 are movable inwardly into the annular recess 42 of the collet lock sleeve 23.

The lower sections of the outer tubular member 21 are then held stationary while the tool 150 is rotated by means of its handles 166 to cause the collet lock sleeve 23 to again be fully threaded into the spring retainer sleeve 24. During such rotational movement of the tool 150, the upper sub and the collet lock sleeve are caused to rotate with the tool 150 due to the action of the catch 165 which holds the upper sub rigid with the tool body 151. During such rotational movement of the upper sub and the collet lock sleeve 23 of the plug 20, due to the engagement of the upper end of the inner sleeve 46 with the shoulder 190 of the catch 165, the inner sleeve is moved downwardly relative to the spring retainer sleeve 23 and to the ball retainer sleeve 25 against the resistance of the spring 47 until the recesses 73 are aligned with the ball apertures 75 of the ball retainer sleeve 25 so that the balls 74 are free to move inwardly of the outer surface of the ball retainer sleeve 25. As a result, both the collet bosses 36 and the balls 74 are free to move into retracted positions to permit the plug to be inserted into the drill pipe box 125. When the upper sub 22 is inserted into the tool body 151 and the tool 150 is rotated in the manner described above, the free end of the prong 159 engages the secondary valve 100 and the main valve 82 and moves them to the open positions illustrated in FIGURE 5.

The plug 20 may now be inserted into the upper end of the drill pipe box 125, the open valves 82 and 100 now permitting the flow of drilling mud through the inner sleeve 46, if drilling mud is present in the drill pipe, as the plug 20 is inserted into the upper end of the drill pipe box. The expander element 64 of course would tend to prevent flow of such well fluids between the outer tubular member and the drill pipe box whenever any flow of fluid tends to take place between the outer tubular member and the drill pipe box during the insertion of the plug 20 in the drill pipe box so that the valve 82 must be opened to permit proper insertion of the plug in the drill pipe box.

When the flange 162 of the running tool 150 engages the upper end of the drill pipe box 125, the balls 74 are positioned below the downwardly facing shoulder 132 of the drill pipe box and the bosses 36 of the collet 33 are positioned above or in engagement with the upwardly facing shoulder 130 of the drill pipe box. The bell crank lever 180 is now again rotated in a counter-clockwise manner to move the shoulder 190 of the catch 165 out of engagement with the upper end of the inner sleeve 46. When this occurs the inner sleeve 46 is moved upwardly to the position illustrated in FIGURE 1 due to the action of the biasing spring 47. As a result, the lower section 70 of the inner sleeve 46 moves upwardly relative to the ball retainer sleeve 25 of the outer tubular member so that the recesses 73 move upwardly relative to the ports 75 and the slots 72 of the upper portion of the lower section 70 are moved into alignment with the ball retainer apertures 75 of the ball retainer sleeve 25 whereby the balls 74 are moved to the expanded positions illustrated in FIGURE 2. The outer portions of such balls now extend outwardly of the ball retainer sleeve and will engage the downwardly facing shoulder 132 of the drill pipe box 125 upon upward movement of the plug in the drill press box.

The bell crank 180 is then fully pivoted in a clockwise manner to move the inner end of the catch 165 out of engagement with the lateral aperture 193 of the upper sub of the plug 20 so that the tool 150 may now be moved upwardly of the upper plug out of engagement therewith. As this occurs, the weight of the plug will cause it to move downwardly to the position illustrated in FIGURES 11 and 14, the collet 33 not being able to move downwardly due to engagement of the bosses 36 thereof with the upwardly facing shoulder 130, the upper sub moves downwardly relative to the collet 33 so that the internal surfaces 39 of the collet now abut the outer surface of the upper sub and the bosses are thereby prevented from moving into retracted positions. The collet now prevents downward movement of the plug in the drill pipe box 125.

The upward movement of the tool 150 relative to the plug of course moves the prong 159 upwardly and out of engagement with the valves 100 and 82 so that the valves now move upwardly to the closed positions illustrated in FIGURE 9. The plug is now in operative position in the drill pipe box 125 and, as is explained above, will permit pumping of well fluids downwardly through the plug while preventing upward or back flow of such drilling fluids. Drilling mud may be pumped to the drill pipe box in the usual manner.

When it is desired to remove the plug from the upper drill pipe box 125, the position of the operating tool or running tool 150 is reversed so that the free end of the sleeve 154 will pass downwardly through the upper end of the upper sub 22 and engage the upper end of the inner sleeve 46. As the tool is rotated, the sleeve 154 moves downwardly in the sub due to the engagement of the threaded portions 200 of the sleeve 154 with the threads 28 of the upper sub. The sleeve 46 is therefore moved downwardly relative to the ball retainer sleeve 25 so that the deep recesses 73 are again aligned with the ball apertures 75 of the ball retainer sleeve 25. The prong 159 also is reversed so that it engages the valves 100 and 87 and opens them. As a result, the plug may be removed from the drill pipe box since the balls 74 will move to their inner retracted positions upon engaging the downwardly and outwardly facing shoulder 132 of the drill pipe box.

It will now be apparent that a new and improved running tool 150 has been illustrated and described which is telescopable over the upper end of the outer tubular member 21 of the plug 20 and that it is provided with a catch 165 for holding the inner sleeve downwardly relative to the outer tubular member 21 so that the locking means or balls 74 are free to move into retracted positions in the recesses 73 during the installation or running in of the plug in the upper drill pipe box 125.

It will further be seen that the tool 150 is also provided with a prong 159 which is disposed in the plug to engage the valve 82 of the inner sleeve to hold in open so that the plug may be inserted in the drill pipe box 125 even though fluids, such as drilling mud, are present therein.

It will be further be seen that the running tool 150 is provided with an external flange 162 which limits telescoping movement of the plug connected thereto into the drill pipe box 125 so that it positions the collet 33 and the balls 74 properly in relation to the stop shoulders 130 and 132 of the drill pipe so that upon disengagement of the catch 165 with the inner sleeve 46, the collet and the balls 74 function properly to hold the plug in proper position in the drill pipe box 125.

It will further be seen that the installation tool is provided with a sleeve 154 which is telescopable in the upper sub to engage the upper end of the inner sleeve to move it downwardly upon rotation of the installation tool relative to the upper sub to again move the inner sleeve 46 downwardly relative to the outer tubular member to again permit the balls 74 to move into retracted positions in the deep recesses 73 whereby the same running tool 150 which is usable to install the plug 20 in the drill pipe box 125 may be used to remove the plug 20 from the drill pipe box.

The running tool 150 of course may be used to install and remove the plug 20 in a drill pipe box which is accessible to the surface of the well and cannot be used to run the plug through the drill pipe to a position deep in the drill pipe. The running tool 225 illustrated in FIGURES 6 through 9 of the drawing may be used in connection with a flexible line to lower the plug 20 through the drill pipe to any drill pipe box 126 thereof and lock the plug in such drill pipe box. Each drill pipe box 126 of the drill pipe is connected to the next higher drill pipe section by means of the drill pipe pin 226 of such higher drill pipe section.

The running tool 225 includes a tubular housing 228 whose upper reduced section is provided with a top sub 230 having a lower reduced portion 231 threaded in the upper end thereof. The upper sub is provided with an external flange 232 which is adapted to engage the upper end of the housing 228 to limit downward movement of the upper sub relative to the housing 228. The upper sub 230 may in turn be connected by means of a suitable fitting 233 to a flexible line by means of which the running tool may be lowered through the drill pipe 127.

The lower portion of the housing 228 is enlarged to telescope over the upper sub 22 of the outer tubular member 21 of the plug 20 and is provided with a downwardly facing shoulder 235 which properly positions the housing 228 on the outer tubular member so that the shear pin 237, which extends through suitable lateral apertures of the housing 228, may extend into the external annular recess 27 of the upper sub 22. The lower end of the housing 228 is adapted to engage the upper end of the collet 33 to hold it in a lower position relative to the outer tubular housing so that the lower bosses 36 of the collet fingers are positioned in alignment with the recess 42 of the collet lock sleeve 23 whereby the bosses 36 may move inwardly to retracted positions to permit downward movement of the plug past upwardly facing obstructions which may be engaged by the lower shoulders of the bosses 36 during the movement of the plug 20 through the drill pipe.

The running tool 225 is also provided with an elongate release shaft 240 having a longitudinal slot 241 in which is pivotally mounted a dog 243 by means of a pin 244 extending transversely through the elongate slot 241 and through aligned apertures in the dog 243 and in the release shaft 240. The dog 243 is biased outwardly through an elongate slot 246 of the housing 228, aligned with the elongate slot 241 of the release shaft, by a spring 248 which is coiled around the pin 244 and has one end engaged in a slot 249 of the dog and has its other end bearing against a stop pin 250 mounted on the release shaft and extending through the elongate slot 241 thereof beneath the pin 244. The release shaft 240 is maintained in alignment with the housing 228 so that the slots 241 and 246 are aligned by means of a socket screw 252 screwed into the upper end of the release shaft which extends laterally outwardly into an upper elongate slot 254 of the housing 228. The socket screw 252 and slot 254 connection permits a limited longitudinal movement of the release shaft relative to the housing 228.

The release shaft is biased downwardly by a compression spring 256 disposed in a downwardly opening bore 257 of the upper sub 230 of the running tool. The opposite ends of the spring bear against the top sub 230 and against the upper end of the release shaft.

The lower end of the release shaft is provided with a downwardly opening bore 260 and with lateral ports 261 adjacent the upper end of the bore 260 which permit flow of fluids through the bore and through the ports 261 to the ports 262 of the housing 228 when the running tool is in the operative position illustrated in FIGURES 6 and 7. The lower end of the release shaft has an external annular flange which provides an upwardly facing shoulder 265 which is adapted to engage the downwardly facing shoulder 266, FIGURE 8, of the upper prong sleeve 267 which is releasably secured to the lower end of the release shaft by means of shear pins 268 extending through aligned lateral bores in the release shaft and the prong sleeve when the prong sleeve is in the lower position relative to the release shaft illustrated in FIGURE 6. The upper prong sleeve 267 is secured to the upper end of the prong 270 by means of a connector sub 271 whose upper enlarged end is threaded into the lower end of the prong sleeve 267 and whose lower reduced end is provided with a downwardly opening bore into which is threaded the upper end of the prong 270.

The sub 271 is provided with lateral ports 273 which permit flow of fluids from below the connector sub upwardly into the bore 260 of the release shaft and thence through the lateral ports 261 of the release shaft and 262 of the housing when the running tool is being moved longitudinally through the drill pipe.

The prong sleeve 267 has an external annular flange 275 providing a downwardly facing shoulder 276 which abuts the upper end of the inner sleeve 46 to hold it in its lower position relative to the outer tubular member 21 of the plug against the force of the spring 47 when the prong sleeve 267 and the release shaft 240 are connected by the shear pin 268 in the position illustrated in FIGURE 6. The prong 270 engages the valve 82 and the secondary valve 100 and holds these valves downwardly in their open positions.

In use, when it is desired to locate the plug 20 in a drill pipe section 126 which is located below the surface, the plug 20 is connected to the running tool in the manner illustrated in FIGURES 6 and 7 wherein the inner sleeve 46 is held in the lower position against the force of the spring 47 so that the recesses 73 are aligned with the ball aperture 75 of the outer tubular member so that the balls 74 may move to the inner retracted positions illustrated in FIGURE 7. The prong 270 of the running tool now holds the valves 82 and 100 in their lower open positions so that any fluids which may be in the drill pipe may flow upwardly through the elongate slots 95 and the lower end of the outer tubular member between the spider legs 91 into the inner sleeve about the prong 270 and through the ports 273 of the connector sub 271 to the upper prong sleeve 267 and thence to the bore 260 of the release shaft 240 to the ports 261 thereof and thence through the ports 262 of the housing 228 of the running tool. In this manner the running tool and plug may be moved downwardly through the drill pipe while the fluids in the drill pipe flow therethrough past the plug and running tool to facilitate passage of the plug and running tool through the drill pipe.

During such movement, of course, the collet 33 is held in its lower position by the lower end of the housing 228 so that the collet bosses 36 may flex inwardly into the annular recess 42 of the outer tubular member whenever the collet bosses 36 engage any upwardly facing obstructions in the drill pipe.

When the drill pipe plug 20 has been lowered to a position in a section 127 of the drill pipe 126 in which the well plug is desired to be secured, the running tool is moved downwardly thereinto until the upper end of the dog 243 is located below the lower end 280 of the pin end of the immediately upper drill pipe section and the spring 248 then biases the upper outer end 282 of the dog into the annular recess formed by the lower end 280 of the pin end of the upper drill pipe section and the upwardly facing shoulder 283 of the lower drill pipe section 127. Upward jars are then imparted to the running tool by means of the flexible line which is secured to the fitting 233 and therefore to the upper sub 230 to cause the housing 228 of the running tool to move upwardly relative to the release shaft 240, upward movement of the release shaft now being prevented by the engagement of the dog 243 with the lower end 280 of the upper drill pipe section. Such upward jars imparted to the housing 228 of the running tool causes the outer tubular member 21 of the drill pipe plug also to move upwardly relative to the release shaft 240 and since the upward movement of the outer tubular member relative to the inner sleeve 46 is limited due to the engagement of the flange 44 of the outer tubular member with the downwardly facing shoulder 49 of the inner sleeve, the upward jars cause the inner sleeve also to move upwardly relative to the release shaft 240. Since the upper end of the inner sleeve 46 of the tool bears against the downwardly facing shoulder 276 of the upper prong sleeve 267, the force of the upwardly directed jars cause the shear pins 268 to shear to permit upward movement of the upper prong sleeve 267 relative to the release shaft 240. Such upward movement of the inner sleeve and of the upper prong sleeve 267 causes the recesses 73 to move upwardly relative to the ball apertures 75 to move the locking balls 74 outwardly therethrough into expanded locking positions and, at the same time, the prong 270 moves upwardly due to the force of the spring 47 and to the valve springs 94 and 104 so that the valves 82 and 100 now move to their closed positions.

Figure 8:
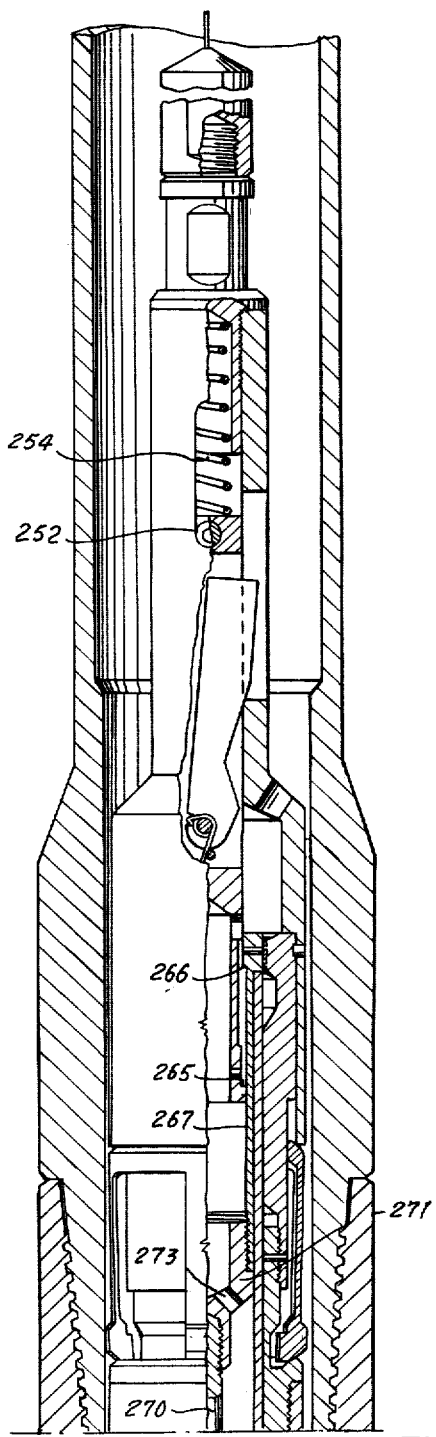
FIGURE 8 is a vertical view, partly in elevation and partly in section, of the upper portions of the running tool and well plug illustrated in FIGURES 7 and 6 showing the elements of the running tool in the positions assumed at an intermediate stage of the operation of the running tool prior to its complete disconnection from the plug.

Since the release shaft is no longer held upwardly in its upper position in the housing 228 by the force of the spring 47 of the plug 20, the force exerted by the spring 256 also simultaneously moves the release shaft 240 downwardly in the housing 228 to the position illustrated in FIGURE 8, such downward movement being limited by the engagement of the socket screw 252 with the lower end of the slot 254 of the housing 228. During such downward movement of the release shaft relative to the housing 228, the cam surface 284 of the dog 243 by engagement with the lower end of the slot 246 of the housing 228 causes the dog 243 to pivot in a counter-clockwise manner into the slot 241 against the force exerted by the spring 248 to the position illustrated in FIGURE 8. The balls 74 will now engage the downwardly facing shoulder 132 of the drill pipe section 126 to limit upward movement of the plug in the drill pipe.

Further upward jars then imparted to the running tool will cause the shear pins 237 to shear to free the housing 228 of the running tool from the upper end of the outer tubular member 21 of the plug. The running tool may then be removed upwardly from the drill pipe. The collet 33 is then free to move upwardly on the upper outer tubular member of the plug 20 so that if the plug 20 thereafter moves downwardly in the drill pipe section 126, the bosses 36 will engage the upwardly facing shoulder 283 of the lower drill pipe section to cause the collet 33 to move upwardly on the outer tubular section to the position illustrated in FIGURE 14 wherein the bosses 36 at the lower ends of the collet fingers are disposed above the recess 42 so that the collet bosses no longer may flex inwardly and thus the plug is held against downward movement in the drill pipe section 126. The cup seal 58 is then expanded in the manner described above to seal between the drill pipe section 126 and the outer tubular member of the plug whereby fluids such as drilling mud may then be pumped downwardly through the drill pipe and through the plug, due to the downward movement of the valves 82 and 100, while upward movement of such fluids is prevented by the action of the cup seal 58 and the valves 82 and 100.

It will now be apparent that a new and improved running tool for a plug has been illustrated and described which includes a prong for holding the valves 82 and 100 of the plug open and that the prong is connected to a release shaft 240 which is biased to the upper position illustrated in FIGURE 6 by the force of the spring 47 of the plug.

It will further be seen that when the release shaft is in the upper position illustrated in FIGURE 6, the dog 243 is biased outwardly of the running tool whereby it may engage a downwardly facing obstruction, such as the shoulder 280, to release the release shaft for movement to its lower position.

It will further be seen that the prong is provided with an extension or sleeve 267 at its upper end which holds the inner sleeve 46 of the plug in its lower position wherein the recesses 73 are aligned with the ball apertures 75 whereby the balls 74 are free to move inwardly to retracted positions in the recesses 73.

It will further be seen that the running tool is provided with flow passages and ports which permit passage of fluids through the plug and through the running tool to facilitate movement of the plug and the running tool through a drill pipe which is filled with fluids.

It will further be seen that the housing 228 opposite the slot 246 is provided with a boss 290 which is adapted to bear against the internal wall of the drill pipe to prevent undue lateral movement of the well tool when the dog 243 engages the shoulder 280 during upward movement of the running tool to cause release of the release shaft from the housing 228 to permit it to move to the lower position illustrated in FIGURE 8.

It will also now be seen that a new and improved running tool for positioning and locking the plug 20 in a drill pipe section disposed below the surface of the well has been illustrated and described which includes means for holding the valves of the inner sleeve in their lowermost position to permit flow of fluids through the plug during downward movement of the plug to its desired position in the drill pipe and which is also provided with means for holding the inner sleeve in its lowermost position relative to the outer tubular member 21 of the plug whereby the balls 74 are free to move to their inner retracted positions to permit such downward movement of the plug through the drill pipe section.

It will further be seen that the running tool is releasably connected to the plug so that upward jars are imparted to the running tool which will free the plug from the running tool and leave it locked in operative position in the drill pipe in a desired position therein.

Referring now particularly to FIGURES 10, 11, 12, 13, 14 and 15 of the drawing, the pulling tool 300 there illustrated may be used for pulling or retrieving the drill pipe plug 20 from the drill pipe when the drill pipe plug 20 is located at a position below the surface of the well and cannot be retrieved by use of the running tool 150 illustrated in FIGURES 4 and 5 of the drawing. The retrieving tool 300 includes a top sub 302 having a reduced externally threaded upper end 303 by means of which it may be secured to a flexible line. The top sub 302 is provided with a downwardly opening bore in which is threaded the upper end of a tubular core 305 secured against rotation relative thereto by a pin 306 which extends through aligned apertures in the tubular core in the upper sub. A prong 308 is in turn threaded in the lower end of the tubular core 305 and is secured thereto against rotation by means of a pin 309 which extends through aligned apertures therein. The prong 308 is provided at its upper portion with a bore or passage 312 and with lateral ports 313 which communicate with the passage 312 below the lower end of the tubular core. The upper sub 302 is provided with lateral ports 315 so that fluids may flow through the tubular core entering into the lower end thereof through the ports 313 and flow passage 312 of the prong and flowing outwardly of the upper end of the tubular core and laterally outwardly from the top sub 302 through the lateral ports 315 thereof.

A tubular outer body 318 is mounted on the tubular core 305 for limited longitudinal movement thereon and has an internal annular flange 320 intermediate the ends thereof which provides a downwardly facing annular shoulder 321 which is adapted to engage the upwardly facing annular shoulder 322, provided by the enlarged lower portion 323 of the tubular core, to limit downward movement of the tubular body 318 on the tubular core 305. A locking ring 325 is disposed in the tubular body above the internal annular flange 320 thereof, whose upper shoulder 326 its lower end engages, and is held in place in the outer tubular body 318 by a shearable bolt 328. The upper end of the locking ring 325 is adapted to engage the lower end of the sub 302 of the retrieving tool to limit upward movement of the outer tubular body on the tubular core 305.

The internal lower surface 330 of the locking ring 325 extends downwardly and outwardly to provide an annular space between the tubular core and the locking ring above the annular flange 320 of the tubular body 318 for the reception of a split ring slip 332. The split ring slip has a slot 334 between its adjacent ends in which is inserted a key 335 integral with the locking ring 325 which prevents rotation of the slip 332 relative to the locking ring and therefore relative to the outer tubular body 318. The slip 332 is internally threaded. The threads have lower surfaces which extend substantially horizontally or perpendicularly inwardly and whose upper surfaces extend inwardly and downwardly so that the tubular core may move relatively easily downwardly through the tubular outer member 318 when a downward force is imparted thereto but cannot move easily upwardly in the tubular member except by rotation of the tubular core in a counter-clockwise manner relative to the tubular outer member 318. Downward movement of the core relative to the slip 332 and therefore to the outer tubular body 318 is further facilitated by the outward flexing of the slip which is carried downwardly with the core relative to the camming surface 330 which thus permits outward expansion of the slip, such outward expansion being facilitated by the split construction of the slip. Upward movement of the tubular core relative to the outer tubular body 318, except by rotation of the tubular core relative to the outer tubular body 318, is further made difficult by the wedging action of the outer surfaces of the slip and of the surface 330 which causes the internal teeth of the slip to move into firmer engagement with the tubular core 305 upon upward movement of the core in the tubular body 318.

The slip is provided with external annular grooves 340 which, by removing portions of the slip, make it more resilient and facilitate such inward and outward flexing thereof.

The outer body 318 has its internal bore enlarged at its lower portion to receive the threaded upper end of a collet 345 secured against rotation therein by a pin 346 which extends through aligned lateral apertures in the outer body 318 and in the upper portion of the collet 345. The collet has resilient collet fingers 348 which extend below the lower end 349 of the outer body 318 and which are provided with external bosses 350 having outwardly convergent upper and lower cam shoulders. When the tubular body 318 is in its lowermost position on the tubular core 305 as illustrated in FIGURE 10, the lower ends of the collet fingers 348 are disposed below the lower end of the tubular core 305 so that they are free to flex inwardly.

The tubular body is releasably held in this lower position by a shear pin 353 disposed in a suitable lateral bore 354 of the outer body 318 whose inner portion extends into a bore or recess 355 in the enlarged lower portion 323 of the tubular core 305. The shear pin 353 is held in position by a screw 357 threaded in the bore 354.

When it is desired to remove the drill pipe plug 20 from the drill pipe when the plug 20 is located below the surface of the well and out of reach of the well tool 150 illustrated in FIGURES 4 and 5, the well tool 300 is secured to the lower end of a flexible line and lowered into the drill pipe while the outer tubular body 318 is in the lowermost position on the tubular core 305 illustrated in FIGURE 10. Downward movement of the retrieving tool is facilitated by the provision of the ports 313 and 315 in the prong and in the upper sub 302, respectively, which permit flow of fluids through the tubular core as the retrieving tool is lowered through the drill pipe. The retrieving tool is lowered until the lower outwardly and upwardly inclined shoulders of the bosses 350 of the collet fingers abut the downwardly and inwardly inclined shoulders 360 of the upper sub 22 of the outer tubular member 21 of the plug 20. Downward jars are then imparted to the retrieving tool to cause the bosses 350 to cam the lower ends of the collet fingers inwardly and thus to move into the internally threaded portion 28 of the upper sub 22 until the lower ends of the collet fingers abut the upper end of the internal sleeve 46. Further downward jars are then imparted to the running tool to cause the inner sleeve 46 of the running tool to move further downwardly in the outer tubular member 21 thereof and to cause the bosses 350 of the collet 345 to move into alignment with and then into the internal annular recess 29 of the upper sub 22 of the plug.

At this stage of the sequence of operation of the retrieving tool, the lower end 349 of the outer body 318 of the retrieving tool abuts the upper end of the upper sub 22 of the plug but the inner sleeve 46 has not been moved a sufficient distance downwardly relative to the outer tubular member 21 of the plug so as to position the recesses 73 thereof in alignment with the ball port 75. As a result, the locking balls 74 are still in their expanded outer positions. Since the lower end 349 of the tubular outer body 318 of the retrieving tool now abuts the upper end of the upper sub of the plug, further downward jars imparted to the running tool cause the shear pin 353 to shear and cause the tubular core 305 to move downwardly in the outer body 318. The configuration of the teeth of the slip 332 permits such downward movement of the core while preventing upward movement thereof relative to the outer body 218. As a result, continued downward jarring imparted to the upper sub 302 of the retrieving tool causes the tubular core 305 to move downwardly relative to the outer body 318 so as to position the enlarged portion 323 thereof behind the bosses 350 which are thus prevented from moving inwardly and out of the internal recess 29 of the upper sub of the outer tubular member of the drill pipe plug. At the same time, the downwardly facing annular shoulder 362 of the tubular core 305 engages the upper end of the inner sleeve 46. Shortly prior to the engagement of the annular shoulder 362 of the tubular core 305 with the upper end of the inner sleeve, the lower end of the prong 308 engages the secondary valve 100 and then the valve 82 and opens them. As a result, the pressures across the plug 20 are equalized so that further downward jars imparted to the upper sub 302 of the retrieving tool will now easily cause the tubular core 305 and the inner sleeve 46 to move downwardly relative to the outer tubular member 21 of the plug and of the outer body 318 of the retrieving tool against the force of the spring 47 of the plug.

Further downward blows imparted to the upper sub 302 of the retrieving tool now gradually move the tubular core 305, and thus the inner sleeve, downwardly relative to the outer tubular member 21 of the plug until the recesses 73 of the inner sleeve are aligned with the ball apertures 75 of the outer tubular member 21 of the plug so that the balls 74 are free to move into inner retracted positions. Upward movement of the core is prevented by the action of the threads of the slip 332.

When the inner sleeve 46 has been moved to the position wherein the recess 73 is in alignment with the apertures 75 and the balls 74 are free to move to their retracted positions, the retrieving tool is pulled upwardly and, since the bosses 350 are now held in the internal recess 29 of the upper sub 22 of the outer tubular member of the plug 20, such upward movement of the retrieving tool also carries the plug 20 upwardly. The collet 33 of the plug 20 is now free to move downwardly to the position wherein its lower bosses 36 are in alignment with the recess 42 and thus are free to flex inwardly upon meeting downwardly facing obstructions in the drill pipe. In this manner the plug may be removed from the drill pipe by means of the retrieving tool 300.

In the event that, for any reason, the drill pipe plug is immovable in the drill pipe, the retrieving tool 300 may be disengaged from the plug and removed from the drill pipe by imparting upward jars to the upper sub 302 of the retrieving tool. The force of such jars is transmitted through the tubular core 305 and the slip 332 to the locking ring 325 since the configuration of the threads of the slip is such as to prevent upward movement of the tubular core relative thereto. As a result, the bolt 328 shears to permit the locking ring 325 and the tubular core 305 to move upwardly relative to the outer tubular body 318, which is held immovably relative to the upper sub 22 of the plug due to the engagement of the bosses 350 of the collet 345 in the annular internal recess 29 of the upper sub 22. Upward movement of the tubular core 305 relative to the tubular member 300 causes the shoulders 322 and 321 of the tubular core and the outer body to engage. At this time the bosses 350 of the collet fingers of the collet 345 are positioned below the lower end of the tubular core and are free to flex inwardly when a further upward force is imparted to the upper sub 302 of the retrieving tool. The camming action of the downwardly and inwardly sloping upper shoulders of the bosses 350 now cams the bosses 350 inwardly out of the internal annular recess 29 of the upper sub 22 of the plug 20 and thus frees the retrieving tool from the plug. The retrieving tool can then be retracted from the drill pipe plug leaving the plug in the drill pipe. The valves 82 and 100, of course, open as the prong moves upwardly with the tubular core 305 during such upward movement of the running tool.

The tubular core 305 may be moved to its upper position relative to the outer body 318 by rotation thereof relative to the outer body 318.

It will now be apparent that a new and improved running or retrieving tool 300 for removing the plug 20 from the drill pipe has been illustrataed and described which includes an inner member on which an outer member is telescoped and that a slip means for connecting the two has been provided which permits upward movement of the inner member relative to the upper member upon the imposition of an upward force on the inner member.

It will further be seen that the slip means prevents downward movement of the inner member relative to the outer member except upon rotational movement of one relative to the other.

It will further be seen that the outer member is provided with collet means for engaging an internal recess of a well tool which is to be removed by the retrieving tool and that the inner member is provided with a locking surface for holding the collet member in expanded well tool engaging position.

It will further be seen that the inner member is provided with a stop means for engaging the upper end of an inner member of the well tool to move the inner member downwardly to free the well tool for removal from the well upon downward movement of the inner member of the running tool relative to the outer member thereof.

It will further be seen that the retrieving tool is provided with a prong for opening a valve of the well tool which is to be removed by use thereof to equalize the pressures across such well tool.

It will further be seen that the inner member is provided with a flow passage whereby downward movement of the well tool through a well filled with fluids is facilitated.

It will now be apparent that a plug for well conductors such as drill pipes has been illustrated and described which is removably lockable in a drill pipe.

It will further be seen that running or retrieving tools have been illustrated and described which permit installation and removal of the plug in the well conductor.

It will further be seen that one form of the running or retrieving tool is especially adapted for use in the installation of the plug at the surface of the well.

It will further be seen that another form of the running and retrieving tool is especially adapted for the installation of the well plug in a well conductor at a position remote from the surface of the well and that still another form of the running and retrieving tool is especially adapted for removing or retrieving the plug from a position in a well conductor remote from the surface of the well.

It will further be seen that in each form of the running or retrieving tool, the running tool is provided with a prong means for holding open or opening a valve of the plug whereby the pressures across the plug may be equilized during its installation or removal in a well conductor.

It will also be apparent that a well tool or plug for use in a well conductor has been illustrated and described which is provided with a first sealing element for sealing between the well conductor and the well tool which is moved into expanded sealing position by an expander having a resilient sealing member which moves the expander element on the well tool relative to the first seal element upon the establishment of a pressure differential thereacross.

It will further be seen that the first seal element is of a relatively hard resilient substance and does not contact the well conductor until it is moved to expanded position.

The foregoing description of the invention is explanatory only, and changes in the detailed of the construction illustrated may be made by those skilled in the art, within the scope of the appended claims, without departing from the spirit of the invention.

What is claimed and desired to be secured by Letters Patent is:

1. A plug for a well conductor having spaced upwardly and downwardly facing internal shoulders, including: an outer tubular member having a first means movable laterally thereon into expanded position for engaging a downwardly facing shoulder of the well conductor to limit upward movement of the plug in the well conductor; a second means mounted on said outer tubular member for longitudinal and lateral movement thereon between an inner position and a laterally projecting position for engaging an upwardly facing shoulder of a well conductor for limiting downward movement of the well plug in the well conductor; said second means being movable longitudinally of said outer tubular member between a position in which said outer tubular member engages and holds said second means in position for engaging said upwardly facing shoulder and a position in which said second means is movable laterally inwardly out of engaging position; and an inner member mounted in said outer tubular member for limited longitudinal movement therein, said inner member having locking means thereon movable into engagement with said first means for locking said first means in said expanded position.

2. A plug for a well conductor having spaced upwardly and downwardly facing internal shoulders, including: an outer tubular member having a first means movable laterally thereof into expanded laterally projecting position for engaging a downwardly facing shoulder of the well conductor to limit upward movement of the plug in the well conductor; a second means mounted on said outer tubular member and carrying lock means movable laterally between a retracted and a projecting position and normally disposed in projecting position for engaging an upwardly facing shoulder of a well conductor for limiting downward movement of the well plug in the well conductor; said outer tubular member having means thereon engageable with said lock means to hold said lock means in said engaging position when said second means is in one longitudinal position on said outer tubular member and having means permitting lateral movement of said lock means inwardly from engaging position when said second means is in a second longitudinal position on said outer tubular member, an inner member mounted in said outer tubular member for limited longitudinal movement therein, said inner member having locking means movable therewith into engagement with said first means for locking said first means in said expanded position when said inner member is in one extreme longitudinal position relative to said outer member; means biasing said inner member longitudinally of said outer tubular member toward said one extreme position, said inner member having a longitudinal flow passage; and valve means in the flow passage of said inner member for permitting flow of fluids in only one direction through said flow passage.

3. A plug for a well conductor having spaced upwardly and downwardly facing internal shoulders, including: an outer tubular member; a first means mounted on said outer tubular member for limited longitudinal movement thereon, said first means having stop means biased outwardly toward projecting position for engaging an upwardly facing internal shoulder of a well conductor to limit downward movement of said outer tubular member in said well conductor; a second means on said outer tubular member movable laterally thereof into expanded projecting position for engaging a downwardly facing shoulder of the well conductor to limit upward movement of the plug in the well conductor; an inner member mounted in said outer tubular member for limited longitudinal movement therein, said inner member having locking means engageable with said second means for locking said second means in said expanded position when said inner member is in one extreme longitudinal position relative to said outer member; said inner member having means thereon permitting inward lateral movement of said second means from expanded projecting position out of engagement with said downwardly facing shoulder of the well conductor when said inner member is in the opposite extreme longitudinal position relative to said outer member; means biasing said inner member toward said one extreme position; said inner member having a longitudinal flow passage; and valve means in the flow passage of said inner member for permitting flow of fluids in only one direction through said flow passage.

4. An operating tool for the plug of claim 2 including: a body telescopable with respect to the upper end of said outer tubular member; means carried by said body and engageable with the upper end of said inner member for releasably holding said inner member in a position opposite to said one extreme position in said outer tubular member; a valve means actuating member carried by said tool body and engageable with the valve means of said plug for holding said valve means open to permit flow of fluids in either direction through said flow passage, said tool body having means engageable with said second means for holding said second means in said second longitudinal position on said outer tubular member when said operating tool is connected to said plug.

5. An operating tool of the character set forth in claim 4, wherein said means for holding said inner member in said position opposite to said one extreme position comprises latch means laterally movably mounted on said tool body for movement into a position adapted for engagement with the upper end of the said inner member.

6. An operating tool for the plug of claim 2 including: a body telescopable with respect to the upper end of said outer tubular member; means on said body engageable with said outer tubular member for operatively connecting said body with said outer tubular member; means carried by said body and engageable with the upper end of said inner member for releasably holding said inner member in a position opposite to said one extreme position in said outer tubular member, whereby said second means on said outer tubular member may move to said second longitudinal position on said outer tubular member when said operating tool is connected to said plug; and a valve means actuating member carried by said tool body and engageable with the valve means of said plug for holding said valve means open to permit flow of fluids in either direction through said flow passage of said plug.

7. A plug for a well conductor having spaced upwardly and downwardly facing internal shoulders, including: an outer tubular member; a first means mounted on said outer tubular member for limited longitudinal movement thereon, said first means having stop means biased outwardly toward laterally projecting position for engaging an upwardly facing internal shoulder of a well conductor to limit downward movement of said outer tubular member in said well conductor; said stop means being movable laterally inwardly from said laterally projecting position when said first means is in a lowermost position on said outer tubular member; means on said outer tubular member engageable with said stop means of said first means when said first means is in an upper position on said outer tubular member to hold said stop means in said laterally projecting position; second means on said outer tubular member movable laterally thereof to a laterally projecting position for engaging a downwardly facing shoulder of the well conductor to limit upward movement of the plug in the well conductor; an inner member mounted in said outer tubular member for limited longitudinal movement therein, said inner member having locking means thereon engageable with said second means for locking said second means in said laterally projecting position when said inner member is in one extreme longitudinal position relative to said outer member; means biasing said inner member toward said one extreme position; said inner member having a longitudinal flow passage; and valve means in the flow passage of said inner member for controlling flow of fluids through said flow passage; said outer tubular member having a lateral aperture adjacent the upper end thereof providing means for attaching an installation tool thereto.

8. An installation tool for the plug of claim 7 including: a body telescopable with respect to the upper end of said outer tubular member and having a lateral aperture registerable with the lateral aperture of the outer tubular member of the plug; latch means carried by said body and extendable through said lateral apertures into said tubular member to engage the upper end of said inner member for releasably holding said inner member in said one extreme longitudinal position in said outer tubular member; an actuating member carried by said tool body and engageable with the valve means of said plug for holding said valve means open to permit flow of fluids in either direction through the flow passage of the inner member of the plug, said body having means engageable with said first means for holding said first means in said lowermost position on said outer tubular member.

9. An installation tool of the character set forth in claim 8, wherein said latch means for holding said inner member in said one extreme position comprises a member laterally movably mounted on said tool body for lateral movement through said lateral apertures into engagement with the upper end of said inner member.

10. An installation tool for the plug of claim 7 including: a housing releasably connectable to the outer member of the plug, said housing having means engageable with the first means of the plug to hold the first means in lowermost position on said outer member of said plug; and an inner elongate member in said housing including an upper section and a lower section releasably connected to one another, said upper section having latch means extendable outwardly of said housing for engaging a downwardly facing obstruction of a well conductor upon upward movement of the installation tool in a well conductor to release said sections of the inner elongate member for longitudinal movement relative to one another, said lower section having means engageable with the inner member of the plug to hold said inner member in another extreme longitudinal position relative to said outer member wherein said second means are retractable to permit passage of the tubular member past obstructions in a well conductor.

11. An installation tool for the plug of claim 7, including: a housing releasably connectable to the outer member of the plug, said housing having means engageable with the first means of the plug to hold the first means in lowermost position on said outer member of said plug; and an inner elongate member in said housing including an upper section and a lower section releasably connected to one another, said upper section having latch means extendable outwardly of said housing for engaging a downwardly facing obstruction of a well conductor upon upward movement of the installation tool in a well conductor to release said sections of the inner elongate member for longitudinal movement relative to one another, said lower section having means engageable with the inner member of the plug to hold said inner member in another extreme longitudinal position relative to said outer member wherein said second means are retractable to permit passage of the tubular member past obstructions in a well conductor; and means biasing said inner elongate member for longitudinal movement to move said latch means inwardly of said housing.

12. An installation tool for the plug of claim 7 including: a housing releasably connectable to the outer member of the plug, said housing having means engageable with the first means of the plug to hold the first means in lowermost position on said outer member of said plug; and an inner elongate member in said housing including an upper section and a lower section releasably connected to one another, said upper section having latch means extendable outwardly of said housing for engaging a downwardly facing obstruction of a well conductor upon upward movement of the installation tool in a well conductor to release said sections of the inner elongate member for longitudinal movement relative to one another, said lower section having means engageable with inner member of the plug to hold said inner member in another extreme longitudinal position relative to said outer member wherein said second means are retractable to permit passage of the tubular member past obstructions in a well conductor; means biasing said inner elongate member for longitudinal movement to move said latch means inwardly of said housing; and means resiliently biasing said latch member outwardly of said housing.

13. An installation tool for the plug of claim 7 including: a housing releasably connectable to the outer member of the plug, said housing having means engageable with the first means of the plug to hold the first means in lowermost position on said outer member of said plug; and an inner elongate member in said housing including an upper section and a lower section releasably connected to one another, said upper section having latch means extendable outwardly of said housing for engaging a downwardly facing obstruction of a well conductor upon upward movement of the installation tool in a well conductor to release said sections of the inner elongate member for longitudinal movement relative to one another, said lower section having means engageable with the inner member of the plug to hold said inner member in another extreme longitudinal position relative to said outer member wherein said second means are retractable to permit passage of the tubular member past obstructions in a well conductor, said lower section having means engageable with said valve means for holding said valve means open to permit flow of fluids in either direction through said flow passage of said inner member.

14. A plug for a well conductor having spaced upwardly and downwardly facing internal shoulders, including: an outer tubular member having a first means movable laterally thereof into expanded laterally projecting position for engaging a downwardly facing shoulder of the well conductor to limit upward movement of the plug in the well conductor; a second means longitudinally movably mounted on said outer tubular member and carrying lock means movable laterally between a retracted and a projecting position and normally disposed in projecting position for engaging an upwardly facing shoulder of a well conductor for limiting downward movement of the well plug in the well conductor; said outer tubular member having means thereon engageable with said lock means to hold said lock means in said engaging position when said second means is in one longitudinal position on said outer tubular member and having means permitting lateral movement of said lock means inwardly from engaging position when said second means is in a second longitudinal position on said outer tubular member; an inner member mounted in said outer tubular member for limited longitudinal movement therein, said inner member having locking means movable therewith into engagement with said first means for locking said first means in said expanded position; and means biasing said inner member longitudinally of said outer tubular member toward locking position.

15. A plug for a well conductor having spaced upwardly and downwardly facing internal shoulders, including: an outer tubular member having a first means movable laterally thereof into expanded laterally projecting position for engaging a downwardly facing shoulder of the well conductor to limit upward movement of the plug in the well conductor; a second means mounted for limited longitudinal movement on said outer tubular member and having lock means thereon biased to a laterally projecting position for engaging an upwardly facing shoulder of a well conductor for limiting downward movement of the well plug in the well conductor; said lock means being movable laterally inwardly from said projecting position; means on said outer tubular member movable therewith into engagement with said lock means for holding said lock means in said laterally projecting position; an inner member mounted in said outer tubular member for limited longitudinal movement therein, said inner member having locking means movable longitudinally therewith into engagement with said first means for locking said first means in said expanded laterally projecting position when said inner member is in one extreme longitudinal position relative to said outer member; means biasing said inner member toward said one extreme position, said inner member having a longitudinal flow passage; and valve means for permitting flow of fluids in only one direction through said flow passage, said first means comprising balls positioned in apertures provided in said outer tubular member and movable laterally to a position projecting outwardly of said apertures, said inner member having recess means movable into registry with said apertures to permit the said balls to move inwardly of said outer tubular member when said inner member is in another extreme longitudinal position relative to said outer member.

16. A plug for a well conductor having spaced upwardly and downwardly facing internal shoulders, including: an outer tubular member having a first means movable laterally thereof to laterally projecting position for engaging a downwardly facing shoulder of the well conductor to limit upward movement of the plug in the well conductor; a second means mounted on said outer tubular member for limited longitudinal movement thereon and having laterally projecting lock means thereon resiliently held in projecting position for engaging an upwardly facing shoulder of a well conductor for limiting downward movement of the well plug in the well conductor; an inner member mounted in said outer tubular member for limited longitudinal movement therein, said inner member having locking means movable longitudinally therewith into engagement with said first means for locking said first means in said laterally projecting position when said inner member is in one extreme longitudinal position relative to said outer member; means biasing said inner member toward said one extreme position, said inner member having a longitudinal flow passage; and valve means on said inner member for controlling flow of fluids through said flow passage.

17. In a well plug of the character set forth in claim 16, said plug being adapted for use in a well conductor; a sealing assembly including: a first seal element carried by the outer member, said first seal element normally being out of engagement with said well conductor; an expander movable longitudinally on said outer member into engagement with said first first seal element to move said first seal element laterally relative to said well tool into engagement with the well conductor to effect a seal therebetween, and a second seal element mounted externally on said expander and carried by said expander and normally engageable with said well conductor for moving said expander element relative to said first seal element upon the establishment of a pressure differential across the second seal element to cause said first seal element to move into sealing engagement with the well conductor.

18. A plug for a well conductor having spaced upwardly and downwardly facing internal shoulders including: an outer tubular member having a first means movable laterally thereof to laterally projecting position for engaging a downwardly facing shoulder of the well conductor to limit upward movement of the plug in the well conductor; a second means mounted on said outer tubular member and projecting laterally thereof for engaging an upwardly facing shoulder of a well conductor for limiting downward movement of said well plug in the well conductor; said second means being movable longitudinally of said outer tubular member between a position in which said outer tubular member engages and holds said second means in laterally projecting position for engaging said upwardly facing shoulder and a position in which said second means is movable laterally inwardly out of such projecting position; an inner member mounted in said outer tubular member for limited longitudinal movement therein, said inner member having locking means for locking said first means in said laterally projecting position; and sealing means on said outer tubular member for sealing between the outer tubular member and said well conductor, said sealing means comprising a first seal element which in its non-expanded position does not contact the well conductor, an expander element movable longitudinally on the outer tubular member longitudinally thereof into expanding engagement with said first seal element for moving the same into sealing engagement with the well conductor, and a second seal element carried externally by said expander which engages the well conductor whereby the establishment of a pressure diffeerntial thereacross causes the expander element to move relative to the first seal element to move said first seal element laterally into expanded position into sealing engagement with the well conductor.

19. A plug for a well conductor having spaced upwardly and downwardly facing internal shoulders, including: an outer tubular member having first means movable laterally thereof to laterally projecting position for engaging a downwardly facing shoulder of the well conductor to limit upward movement of the plug in the well conductor; second means mounted on said outer tubular member for limited longitudinal movement thereon and having laterally projecting lock means thereon resiliently held in projecting position for engaging an upwardly facing shoulder of a well conductor for limiting downward movement of the well plug in the well conductor; an inner member mounted in said outer tubular member for limited longitudinal movement therein, said inner member having locking means movable longitudinally therewith into engagement with said first means for locking said first means in said laterally projecting position when said inner member is in one extreme longitudinal position relative to said outer member; means biasing said inner member toward said one extreme position; said inner member having a longitudinal flow passage; and valve means for controlling flow of fluids through said flow passage, said first means comprising balls positioned in apertures provided in said outer tubular member and movable laterally thereof to a position projecting outwardly of said apertures, said inner member having recess means movable into registry with said apertures to permit said balls to move inwardly of said outer tubular member to a retracted position when said inner member is in another extreme longitudinal position relative to said outer member; said outer tubular member having an external recess; said lock means of said second means being movable inwardly into said recess in said outer tubular member to a retracted position when said second means is in a lowermost position on said outer tubular member; said outer tubular member having stop means engageable by said lock means of said second means to lock said lock means of said second means in laterally projecting position when said second means is in an uppermost position on said outer tubular member.

20. A plug for a well conductor having spaced upwardly and downwardly facing internal shoulders, including: an outer tubular member; first means mounted on said outer tubular member for limited longitudinal movement thereon, said first means having stop means biased outwardly toward laterally projecting position for engaging an upwardly facing internal shoulder of a well conductor to limit downward movement of said outer tubular member in said well conductor; second means on said outer tubular member movable laterally thereof to laterally projecting position for engaging a downwardly facing shoulder of the well conductor to limit upward movement of the plug in the well conductor; an inner member mounted in said outer tubular member for limited longitudinal movement therein, said outer member having locking means engageable with said second means for locking said second means in said laterally projecting position when said inner member is in one extreme longitudinal position relative to said outer member; means biasing said inner member toward said one extreme position; said inner member having a longitudinal flow passage; and valve means for controlling flow of fluids through said flow passage, said outer tubular member having a lateral aperture adjacent the upper end thereof, said stop means of said first means being retractible on said outer member when said first means is in a lowermost position on said outer member, said outer tubular member having a locking surface thereon engageable with said stop means of said first means when said first means is in an uppermost position on said outer member to maintain said stop means in expanded position.

21. A plug for a well conductor having spaced upwardly and downwardly facing internal shoulders, including: an outer tubular member; first means mounted on said outer tubular member for limited longitudinal movement thereon, said first means having stop means biased outwardly toward laterally projecting position for engaging an upwardly facing internal shoulder of a well conductor to limit downward movement of said outer tubular member in said well conductor; said stop means on said first means being movable laterally inwardly relative to said outer tubular member to a retracted position when said first means is in a first extreme longitudinal position relative to said outer tubular member; said outer member having a locking surface thereon engageable with said stop means of said first means when said first means is in an opposite extreme longitudinal position relative to said outer member to hold said stop means in projecting position; second means on said outer tubular member movable laterally thereof to laterally projecting position for engaging a downwardly facing shoulder of the well conductor to limit upward movement of the plug in the well conductor; an inner member mounted in said outer tubular member for limited longitudinal movement therein, said inner member having locking means engageable with said second means for locking said second means in said laterally projecting position when said inner member is in one extreme longitudinal position relative to said outer member; means biasing said inner member toward said one extreme position; said inner member having a longitudinal flow passage; and valve means in the flow passage of said inner member for controlling flow of fluids in one direction through said flow passage, said outer tubular member having an internal recess adjacent the upper end thereof providing means adapted for connecting a retrieving tool thereto.

22. A retrieving tool for the plug of claim 21 including: an outer tubular body; catch means on said body extending below the lower end thereof, said catch means being adapted to be aligned with and expanded into said recess of said outer tubular member of said plug when the lower end of said tubular body abuts the upper end of said outer tubular member, an elongate member extending through said tubular member; means releasably holding said elongate member in an upper position relative to said tubular body; means engageable with said tubular body and said elongate member for permitting only downward non-rotational longitudinal movement of said elongate member relative to said tubular body, said elongate member having means engageable with said valve means of said plug for holding said valve means open when said elongate member is in a lowermost position relative to said tubular body; and cooperable means on said elongate member and said tubular body limiting longitudinal movement of said elongate body relative to said tubular body.

23. A retrieving tool for the plug of claim 21 including: an outer tubular body; catch means on said body extending below the lower end thereof, said catch means being adapted to be aligned with and expanded into said recess of said outer tubular member of said plug when the lower end of said tubular body abuts the upper end of said outer tubular member, an elongate member extending through said tubular member; means releasably holding said elongate member in an upper position relative to said tubular body; and means engageable with said tubular body and said elongate member for permitting only downward non-rotational longitudinal movement of said elongate member relative to said tubular body, said elongate member having means engageable with said valve means of said plug for holding said valve means open when said elongate member is in a lowermost position relative to said tubular body; said elongate member having lock means engageable with said catch means for holding said catch means in said recess when said elongate member is in said lowermost position relative to said tubular body.

24. An operating tool for the plug of claim 21 including: an outer tubular body; catch means on said body extending below the lower end thereof, said catch means being adapted to be aligned with and expanded into said recess of said outer tubular member of said plug when the lower end of said tubular body abuts the upper end of said outer tubular member, an elongate member extending through said tubular member; means releasably holding said elongate member in an upper position relative to said tubular body; means engageable with said tubular body and said elongate member for permitting only downward non-rotational longitudinal movement of said elongate member relative to said tubular body, said elongate member having means engageable with said valve means of said plug for holding said valve means open when said elongate member is in a lowermost position relative to said tubular body; and cooperable means on said elongate member and said tubular body limiting longitudinal movement of said elongate body relative to said tubular body; said means for permitting only non-rotational downward movement of said elongate member relative to said tubular body including a split ring having internal serrations engageable with the elongate member to prevent non-rotational upward movement of said elongate member upwardly in said tubular body and retainer means carried by said tubular body for limiting upward longitudinal displacement of the said ring relative to said tubular body.

25. An operating tool for the plug of claim 21 including: an outer tubular body; catch means on said body extending below the lower end thereof, said catch means being adapted to be aligned with and expanded into said recess of said outer tubular member of said plug when the lower end of said tubular body abuts the upper end of said outer tubular member, an elongate member extending through said tubular member; means releasably holding said elongate member in an upper position relative to said tubular body; means engageable with said tubular body and said elongate member for permitting only downward non-rotational longitudinal movement of said elongate member relative to said tubular body, said elongate member having means engageable with said valve means of said plug for holding said valve means open when said elongate member is in a lowermost position relative to said tubular body; and cooperable means on said elongate member and said tubular body limiting longitudinal movement of said elongate body relative to said tubular body; said means for permitting only non-rotational downward movement of said elongate member relative to said tubular body including a split ring having internal serrations engageable with the elongate member to prevent non-rotational upward movement of said elongate member upwardly in said tubular body and retainer means carried by said tubular body for limiting upward longitudinal displacement of the said ring relative to said tubular body, said ring and said retainer means have cooperative bevelled surfaces for causing said ring to move inwardly to engage said elongate member more closely upon upward movement of said ring relative to said retainer means.

26. An operating tool for the plug of claim 21 including: an outer tubular body; catch means on said body extending below the lower end thereof, said catch means being adapted to be aligned with and expanded into said recess of said outer tubular member of said plug when the lower end of said tubular body abuts the upper end of said outer tubular member, an elongate member extending through said tubular member; means releasably holding said elongate member in an upper position relative to said tubular body; means engageable with said tubular body and said elongate member for permitting only downward non-rotational longitudinal movement of said elongate member relative to said tubular body, said elongate member having means engageable with said valve means of said plug for holding said valve means open when said elongate member is in a lowermost position relative to said tubular body; cooperable means on said elongate member and said tubular body limiting longitudinal movement of said elongate body relative to said tubular body; said means for permitting only non-rotational downward movement of said elongate member relative to said tubular body including a split ring having internal serrations engageable with the elongate member to prevent non-rotational upward movement of said elongate member upwardly in said tubular body; retainer means carried by said tubular body for limiting upward longitudinal displacement of the said ring relative to said tubular body, and means releasably connecting said retainer means to said tubular body whereby said elongate member may be moved upwardly relative to said elongate body upon the actuation of said release means.

27. An operating tool for the plug of claim 21 including: an outer tubular body; catch means on said body extending below the lower end thereof, said catch means being adapted to be aligned with and expanded into said recess of said outer tubular member of said plug when the lower end of said tubular body abuts the upper end of said outer tubular member, an elongate member extending through said tubular member; means releasably holding said elongate member in an upper position relative to said tubular body; means engageable with said tubular body and said elongate member for permitting only downward non-rotational longitudinal movement of said elongate member relative to said tubular body, said elongate member having means engageable with said valve means of said plug for holding said valve means open when said elongate member is in a lowermost position relative to said tubular body; and cooperable means on said elongate member and said tubular body limiting longitudinal movement of said elongate body relative to said tubular body; said means for permitting only non-rotational downward movement of said elongate member relative to said tubular body including a split ring having internal serrations engageable with the elongate member to prevent non-rotational upward movement of said elongate member upwardly in said tubular body, retainer means carried by said tubular body for limiting upward longitudinal displacement of the said ring relative to said tubular body, and a shearable means connecting said retainer means to said tubular body to prevent upward movement of said retainer means relative to said tubular body.

28. A plug for a well conductor having spaced upwardly and downwardly facing internal shoulders, including: an outer tubular member; first means mounted on said outer tubular member for limited longitudinal movement thereon, said first means having stop means biased outwardly toward laterally projecting position for engaging an upwardly facing internal shoulder of a well conductor to limit downward movement of said outer tubular member in said well conductor; said stop means being movable laterally inwardly from said laterally projecting position when said first means is in a lowermost position on said outer tubular member; means on said outer tubular member engageable with said stop means of said first means when said first means is in an upper position on said outer tubular member to hold said stop means in said laterally projecting position; second means on said outer tubular member movable laterally thereof to laterally projecting position for engaging a downwardly facing shoulder of the well conductor to limit upward movement of the plug in the well conductor; an inner member mounted in said outer tubular member for limited longitudinal movement therein, said outer member having locking means thereon engageable with said second means for locking said second means in said laterally projecting position when said inner member is in one extreme longitudinal position relative to said outer member; means biasing said inner member toward said one extreme position; said inner member having a longitudinal flow passage; and valve means in the flow passage of said inner member for controlling flow of fluids in only one direction through said flow passage, said outer tubular member having an internal recess adjacent the upper end thereof providing means for connecting said outer tubular member with an operating tool for said plug.

References Cited in the file of this patent
UNITED STATES PATENTS

| | | |
|---|---|---|
| 2,189,697 | Baker | Feb. 6, 1940 |
| 2,228,630 | Kail | Jan. 14, 1941 |
| 2,447,546 | Spencer | Aug. 24, 1948 |
| 2,606,618 | Page | Aug. 12, 1952 |
| 2,644,527 | Baker | July 7, 1953 |
| 2,720,267 | Brown | Oct. 11, 1955 |
| 2,790,501 | Garrett et al. | Apr. 30, 1957 |
| 2,806,538 | Conrad | Sept. 17, 1957 |
| 2,944,605 | Dollison | July 12, 1960 |
| 2,948,340 | Bostock et al. | Aug. 9, 1960 |
| 2,962,097 | Dollison | Nov. 29, 1960 |

UNITED STATES PATENT OFFICE
CERTIFICATE OF CORRECTION

Patent No. 3,102,592                      September 3, 1963

William W. Dollison

It is hereby certified that error appears in the above numbered patent requiring correction and that the said Letters Patent should read as corrected below.

Column 7, line 66, after "tool" insert -- or running tool --; line 68, for "121" read -- 125 --; column 10, line 58, for "in" read -- it --; column 18, line 35, for "detailed" read -- details --; column 25, line 50, for "expended" read -- expanded --.

Signed and sealed this 14th day of April 1964.

(SEAL)

Attest:
ERNEST W. SWIDER                              EDWARD J. BRENNER

Attesting Officer                                  Commissioner of Patents